WIDE-RANGE HIGH STABILITY FREQUENCY GENERATING SYSTEM
Filed Dec. 30, 1948
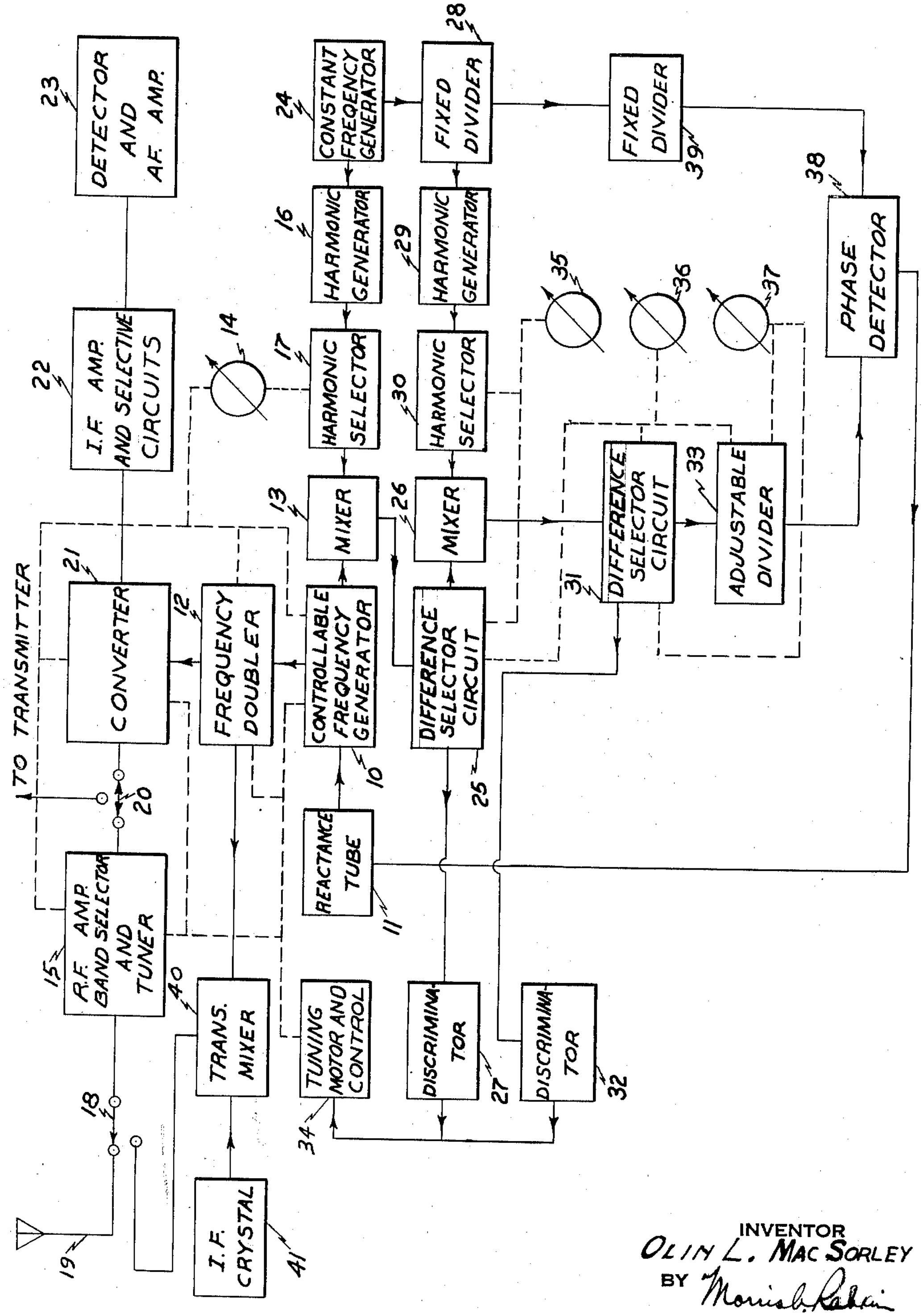
INVENTOR
OLIN L. MAC SORLEY
BY Morris L. Rabkin
ATTORNEY Patented Jan. 8, 1952

2,581,594

UNITED STATES PATENT OFFICE 2,581,594

WIDE-RANGE HIGH STABILITY FREQUENCY GENERATING SYSTEM

Olin L. MacSorley, Collingswood, N. J., assignor to Radio Corporation of America, a corporation of Delaware Application December 30, 1948, Serial No. 68,263

9 Claims. (Cl. 250—20)

This invention relates to an improvement on that disclosed by a copending application of Harris A. Robinson, Ser. No. 14,666, filed March 13, 1948, which ripened into Patent #2,568,412 on September 18, 1951. It involves a frequency generating system operable in a multiplicity of discrete steps over a wide frequency range with a high degree of frequency stability for any chosen step and providing means of automatically tuning said system to any discrete frequency step, and which may be used as part of an automatically tuned radio receiver and/or transmitter which is operable over a wide frequency range with a high degree of stability in its various selected output circuits.

The present invention is like that of the aforesaid invention in that (1) the output of a controllable frequency generator is mixed with that of a selected constant frequency to produce a difference frequency, (2) such difference frequency is applied to the input of a frequency discriminator, and (3) the output of the frequency discriminator is utilized to tune the controllable frequency generator and its associated circuits to the various selected frequencies within the different bands covered by the controllable frequency generator. It is distinguished by the fact that the difference frequency involved in the aforesaid invention is combined with a constant frequency to produce a second difference frequency which is applied to one of the frequency discriminators and to the input of an adjustable division ratio frequency divider. In this case, the output of the adjustable frequency divider is applied to a phase detector in which it is compared with a constant frequency, and variation in the output frequency of the adjustable divider is utilized to regulate each selected output frequency of the controllable frequency generator with a high degree of accuracy.

The purpose of the invention is to provide an improved frequency generating system which is operable over a wide frequency range with crystal accuracy at any one of the selected operating frequencies, and which may be used as the frequency determining source in an automatically tuned radio receiver and/or transmitter.

The invention will be better understood from the following description considered in connection with the accompanying drawing and its scope is indicated by the appended claims.

The single figure of the drawing is a block diagram wherein (1) the blocks bear explanatory legends, (2) single lines are used to indicate the electrical connections between the elements represented by the various blocks, and (3) broken lines are used to indicate the mechanical connections between the various control elements and the parts which they control.

As indicated by the drawings, a controllable frequency generator 10 has its output frequency regulated by means including a reactance tube 11 and supplies its output to a frequency doubler 12 and a mixer 13. The controllable frequency generator may be of any suitable type. For example, it may consist of a plate tuned feedback oscillator, such as is often used in the art, having a number of tank coils, each with its associated feed back coil, together with control switches for selecting any one pair of coils, and a variable condenser for varying the resonant frequency of the chosen tank coil over each band.

In the present invention, these control switches of a generator 10 are operated by means of a control knob 14 which also functions to operate the band selection switches of a radio frequency amplifier 15, the converter 21, and a harmonic selector circuit 17 for the harmonic generator 16.

The radio frequency amplifier 15 has its input connected through a switch 18 to a receiving antenna 19 and delivers its output through a switch 20 to a converter 21. The converter 21 is also energized from the generator 10 through the frequency doubler 12. The intermediate frequency output of the converter 21 is fed to an intermediate frequency amplifier 22 and thence to a detector and audio frequency amplifier 23.

The mixer 13 receives input from the generator 10 and from a constant frequency source 24 through the harmonic generator 16 and the harmonic selector 17.

The difference frequency output of the mixer 13 is supplied to a different frequency selector circuit 25 and thence to a mixer 26. A frequency discriminator 27 also operates from the resonant circuit of the frequency selector 25. The mixer 26 also receives a constant frequency input from a frequency divider 28 through a harmonic generator 29 and a harmonic selector 30.

The difference frequency output of the mixer 26 is applied to a difference frequency selector circuit 31, the output of which goes to an adjustable division ratio frequency divider 33. A frequency discriminator 32 also operates from the resonant circuit of the frequency selector 31.

The frequency discriminators may be of any suitable type such as those disclosed in the aforesaid Robinson application. They function to control a tuning motor 34 which operates to tune the radio frequency amplifier 15, the converter 21, the frequency doubler 12 and the controllable frequency generator 10 to the selected operating frequencies within the different bands selected by the control knob 14. A harmonic selector 30 is operated by a control 35, and the difference frequency selector circuit 25 is adjusted by both selectors 35 and 36. The difference selector circuit 31 and adjustable divider 33 are both controlled by selectors 36 and 37. The selectors 14, 35, 36 and 37 may be calibrated to read directly the frequency of the receiver and transmitter. In this case, the selector 14 will read thousands, the selector 35 hundreds, the selector 36 tens and the selector 37 units. If desired, by proper choice of ratios in the variable divider, fractional kilocycles may also be obtained and shown on control 37. Also, for other applications, the controls can indicate the oscillator frequency directly.

Summarizing: Control 14 operates the first harmonic selector 17 and selects the bands for the R. F. amplifier 15, the converter 21, the frequency doubler 12, and the controlled frequency generator 10. Control 35 operates the second harmonic selector 30 and partly tunes the first difference selector 25. Control 36 completes the tuning of the first difference selector 25, partly tunes the second difference selector 31, and sets the tens section of the variable ratio frequency divider 33. Control 37 completes the tuning of the second difference selector circuit 31 and sets the units section of the variable radio frequency divider 33. The variable ratio divider may be of the type described in my copending application, Serial No. 16,835, filed March 24, 1948, now Patent No. 2,560,968, issued July 17, 1951.

A phase detector 38 receives input from the adjustable frequency division ratio divider 33 and a fixed ratio frequency divider 39 and delivers its output to the reactance tube 11 by which the output frequency of the controllable frequency generator 10 is accurately regulated at any one of its selectable values.

its two inputs, and functions to apply to the reactance tube 11 a potential such that the output frequency of the generator 10 is maintained at the exact desired multiple of the output of the fixed ratio divider. Any deviation therefrom will cause a change in the relative phases, which will change the output of the phase discriminator 38, which will change the control voltage on the reactance tube 11, and correct the frequency of the controlled frequency generator 10.

The other parts of the receiver are conventional and their details are readily understandable without detailed explanation. For example, the radio frequency amplifier 15 may be like that described in Patent 2,419,593.

When the apparatus is utilized as a receiver, the switches 18 and 20 are in their illustrated closed positions and the operation is as indicated above. For operation as a transmitter, the switches 18 and 20 are moved to their other closed positions thus connecting (1) the output of the amplifier 15 to the input of the transmitter amplifiers (not shown), and (2) the input of the amplifier 15 to a transmitter mixer 40 from which is derived an output frequency dependent on the frequency of the controllable frequency generator 10 and that of a crystal controlled generator 41.

Assume the following values in the receiver shown: R. F. 2.0 to 23.999 megacycles, I. F. 1800 kc., constant frequency source 500 kc., operation every kilocycle. From this, the following values would result.

| | |
|---|---|
| Constant freq. generator 24 | 500 kc. |
| Harmonic selector 17 output | 3.0, 3.5, 4.0, 4.5, . . . 13.0, 13.5 mc. |
| Fixed divider 28, ratio | 10 |
| Harmonic selector 30 output | 700, 750, 800, . . . 1100, 1150 kc. |
| Fixed divider 39, ratio | 100 |
| Fixed divider output | 500 cycles |
| Controllable freq. generator 10 | 1900 kc. to 12,899.5 kc. |
| Difference selector 25 output | 1100 to 600.5 kc. |
| Difference selector 31 output | 50 to 99.5 kc. |
| Adjustable divider 33, ratio range | 100 to 199 |
| Adjustable divider 33 output | 500 cycles |

See Table I for frequencies and control settings for a group of typical operating frequencies.

*Table 1*

| Block | 15 | 12 | 10 | 17 | 25 | 30 | 31 | 33 | 14 | 35 | 36 | 37 |
|---|---|---|---|---|---|---|---|---|---|---|---|---|
| Title | R. F. | 2Fc | Fc | Harmonic | Diff. | Harmonic | Diff. | Division Ratio | Thousands | Hundreds | Tens | Units |
| | 2,000 | 3,800 | 1,900.0 | 3,000 | 1,100.0 | 1,150 | 50.0 | 100 | 2 | 0 | 0 | 0 |
| | 2,020 | 3,820 | 1,910.0 | 3,000 | 1,090.0 | 1,150 | 60.0 | 120 | 2 | 0 | 2 | 0 |
| | 2,040 | 3,840 | 1,920.0 | 3,000 | 1,080.0 | 1,150 | 70.0 | 140 | 2 | 0 | 4 | 0 |
| | 2,090 | 3,890 | 1,945.0 | 3,000 | 1,055.0 | 1,150 | 95.0 | 190 | 2 | 0 | 9 | 0 |
| | 2,091 | 3,891 | 1,945.5 | 3,000 | 1,054.5 | 1,150 | 95.5 | 191 | 2 | 0 | 9 | 1 |
| | 2,092 | 3,892 | 1,946.0 | 3,000 | 1,054.0 | 1,150 | 96.0 | 192 | 2 | 0 | 9 | 2 |
| | 2,098 | 3,898 | 1,949.0 | 3,000 | 1,051.0 | 1,150 | 99.0 | 198 | 2 | 0 | 9 | 8 |
| | 2,099 | 3,899 | 1,949.5 | 3,000 | 1,050.5 | 1,150 | 99.5 | 199 | 2 | 0 | 9 | 9 |
| | 2,100 | 3,900 | 1,950.0 | 3,000 | 1,050.0 | 1,100 | 50.0 | 100 | 2 | 1 | 0 | 0 |
| | 2,101 | 3,901 | 1,950.5 | 3,000 | 1,049.5 | 1,100 | 50.5 | 101 | 2 | 1 | 0 | 1 |
| | 2,200 | 4,000 | 2,000.0 | 3,000 | 1,000.0 | 1,050 | 50.0 | 100 | 2 | 2 | 0 | 0 |
| | 2,900 | 4,700 | 2,350.0 | 3,000 | 650.0 | 700 | 50.0 | 100 | 2 | 9 | 0 | 0 |
| | 2,990 | 4,790 | 2,395.0 | 3,000 | 605.0 | 700 | 95.0 | 190 | 2 | 9 | 9 | 0 |
| | 2,999 | 4,799 | 2,399.5 | 3,000 | 600.5 | 700 | 99.5 | 199 | 2 | 9 | 9 | 9 |
| | 3,000 | 4,800 | 2,400.0 | 3,500 | 1,100.0 | 1,150 | 50.0 | 100 | 3 | 0 | 0 | 0 |
| | 3,001 | 4,801 | 2,400.5 | 3,500 | 1,099.5 | 1,150 | 50.5 | 101 | 3 | 0 | 0 | 1 |
| | 3,999 | 5,799 | 2,899.5 | 3,500 | 600.5 | 700 | 99.5 | 199 | 3 | 9 | 9 | 9 |
| | 4,000 | 5,800 | 2,900.0 | 4,000 | 1,100.0 | 1,150 | 50.0 | 100 | 4 | 0 | 0 | 0 |
| | 23,990 | 25,790 | 12,895.0 | 13,500 | 605.0 | 700 | 95.0 | 190 | 23 | 9 | 9 | 0 |
| | 23,995 | 25,795 | 12,897.5 | 13,500 | 602.5 | 700 | 97.5 | 195 | 23 | 9 | 9 | 5 |
| | 23,999 | 25,799 | 12,899.5 | 13,500 | 600.5 | 700 | 99.5 | 199 | 23 | 9 | 9 | 9 |

Receiver, 2.0 to 23.999 mc. in 1000 cycles steps.
Controlled osc. 1.9 to 12.89995 mc. in 500 cycles steps.
I. F., 1800 kc.
First harmonic selector, 3.0, 3.5, 4.0, 4.5, . . . 12.5, 13.0, 13.5 mc.
Second harmonic selector, 700, 750, 800, 850 . . . 1050, 1100, 1150 kc.

The phase detector 38 may be of any suitable type, such as that described in the copending application of John D. Woodward, Serial No. 743,234, filed April 23, 1947, now Patent No. 2,490,499, issued December 20, 1949. It responds to slight variations in the comparative phases of The control knob 14 will be operable to 22 different positions and will function—

(1) To tune the harmonic selector 17 over a frequency range of 3 to 13.5 mc. in steps of 0.5 mc., and (2) To set the bands for the frequency doubler 12, the controlled freq. generator 10, and the R. F. amp. 15.

| Band | R. F. mc. | Doubler mc. | Osc. mc. |
|---|---|---|---|
| 1 | 2.0– 3.0 | 3.8– 4.8 | 1.9– 2.4 |
| 2 | 3.0– 5.0 | 4.8– 6.8 | 2.4– 3.4 |
| 3 | 5.0– 9.0 | 6.8–10.8 | 3.4– 5.4 |
| 4 | 9.0–16.0 | 10.8–17.8 | 5.4– 8.9 |
| 5 | 16.0–24.0 | 17.8–25.8 | 8.9–12.9 |

Under these conditions, there is supplied to the input of the difference frequency selector 25 frequencies which range from 600.5 kc. to 1100.0 kc. by steps of 0.5 kc. Such difference frequencies are supplied to the mixer 26. The resonant circuit of the difference selector 25 is arranged for decade tuning in the same manner as that used for the oscillator described and claimed in my copending application, Serial No. 743,266, filed April 23, 1947, Patent No. 2,532,455 granted December 5, 1950. Thus, the control 35 shifts the resonant frequency in steps of 50 kc. while the control 36 shifts the frequency in steps of 5.0 kc., and the two controls together provide 100 steps of 5.0 kc. each.

In the mixer 26 these first difference frequencies are mixed with the output of the harmonic selector 30. Assuming the divider 28 to have a division ratio of 1 to 10, the input frequency of the harmonic generator 29 is 50 kc. and the control knob 35 is operable to ten different positions for selecting frequencies over a range of 1150 to 700 kc. by steps of 50 kc.

The difference frequency output of the mixer 26 is supplied to the difference frequency selector 31 which is tuned by the control knobs 36 and 37 over a frequency range of 50 to 99.5 kc. by one hundred equal steps, control 36 giving ten steps of 5.0 kc. each and control 37 dividing each step into ten parts of 500 cycles each. These difference frequencies are supplied to the input of the adjustable division ratio frequency divider 33.

The tens selector knob 36 and the units selector knob 37 function to select the frequency division ratio of the divider 33 so that the output frequency of this divider is very nearly the same as that of the fixed frequency divider 39, being exactly the same when control is established. Under these conditions, the phase detector 38 functions to apply to the reactance tube 11 a potential which is responsive to relative variations in the phase of the outputs of dividers 33 and 39, which is utilized to stabilize the output frequency of the generator 10 at each of its selected values.

What is claimed is:

1. In a wide range radio receiver wherein the outputs of a radio frequency amplifier and a controllable frequency wave generator are mixed to produce the input to an intermediate frequency amplifier, said receiver including a first mixer circuit wherein the output of said generator is mixed with harmonics of a first constant frequency wave to produce a first series of selected difference frequency waves, the combination of first selector means coupled to said first mixer circuit for selecting one difference frequency wave from said first series of different frequency waves, circuit means to which said first constant frequency wave is applied to produce a second constant frequency wave, means coupled to said circuit means for selecting harmonics of said second constant frequency wave, a second mixer circuit for mixing said harmonics of said second constant frequency with said first series of difference frequency waves to produce a second series of difference frequency waves, second selector means coupled to said second mixer circuit for selecting one wave from said second series of difference frequency waves, means including a pair of frequency discriminators individually coupled to said first and said second selector means and responsive respectively to said first and to said second series of difference frequency waves and means responsive to the relative outputs of said discriminators for tuning said controllable frequency generator and said radio frequency amplifier, and means including an adjustable division ratio frequency divider coupled to said second selector means and responsive to said second series of difference frequency waves for stabilizing the output wave of said controllable frequency generator at each of its selected operating frequencies.

2. In a wide range radio receiver wherein the outputs of a radio frequency amplifier and a controllable frequency wave generator are mixed to produce the input to an intermediate frequency amplifier and wherein the output of said generator is mixed with a selected harmonic of a first constant frequency wave to produce a first series of selected difference frequency waves, the combination of unitary control means operable to select a harmonic of said first constant frequency wave and to tune said radio frequency amplifier and said controllable frequency generator to a predetermined frequency band, means for selecting one difference frequency wave of said first series of difference frequency waves, means for selecting a harmonic of a second constant frequency wave, means for mixing said first selected difference frequency wave with said selected harmonic of said second constant frequency wave to produce a second difference frequency wave, means including a pair of frequency discriminators responsive respectively to said first and to said second selected difference frequency waves for tuning said controllable frequency generator and said radio frequency amplifier roughly to an operating frequency within said band, and means including an adjustable division ratio frequency divider responsive to said second selected difference frequency wave for stabilizing the output wave of said controllable frequency generator at said selected operating frequency.

3. In a wide range controllable frequency wave generator wherein the output wave of said generator is mixed with a harmonic selected from a first group of harmonics of a constant frequency wave source to produce a first series of difference frequency waves, the combination of unitary control means operable to select one of said harmonics of said first constant frequency and to tune said controllable frequency generator to a predetermined frequency band, means for selecting a difference frequency wave from said first series of difference frequency waves, means for selecting a harmonic of a second constant frequency wave, means for mixing said first selected difference frequency wave with said selected harmonic of said second constant frequency to produce a second difference frequency wave, and means including an adjustable ratio frequency divider responsive to said second difference frequency wave for stabilizing the output wave of said controllable frequency generator at an operating frequency.

4. In a wide range controllable frequency wave generator wherein the output wave of said generator is mixed in a mixing circuit with a harmonic selected from a first group of harmonics of a constant frequency wave source to produce a first series of selected difference frequency waves, the combination of unitary control means operable to select a harmonic of said first constant frequency wave and to tune said controllable frequency generator to a predetermined frequency band, first selector means for selecting a difference frenquency wave from said first series of difference frequency waves, circuit means coupled to said constant frequency wave source to produce a second constant frequency wave, harmonic selecting means coupled to said circuit means for selecting a harmonic of said second constant frequency wave, a second mixing circuit coupled to said first selector means and said harmonic selecting means for mixing said first series of difference frequency waves with said selected harmonic of said second constant frequency to produce a second series of difference frequency waves, second selector means coupled to said second mixing circuit for selecting one wave from said second series of difference frequency waves, means including a pair of frequency discriminators individually coupled to the said first and said second selector means and responsive respectively to said first and to said second series of difference frequency waves for tuning said controllable frequency wave generator to equally spaced frequencies within said band, and means including an adjustable division ratio frequency divider coupled to said second selector means and responsive to said second series of difference frequency waves for stabilizing the output frequency wave of said controllable frequency wave generator at each of its selected operating frequencies.

5. A wide range, frequency-stable wave generating circuit arrangement including a controllable frequency wave generator, a constant frequency wave generator, a mixer circuit, connections coupling the outputs of said controllable frequency and said constant frequency wave generators to said mixer to produce a difference frequency wave, a difference frequency wave selector circuit coupled to said mixer to receive said difference frequency wave, a second mixer circuit, further connections coupling the outputs of said difference frequency wave selector circuit and said constant frequency wave generator to said second mixer to produce a second difference frequency wave, a second difference frequency wave selector circuit coupled to said second mixer to receive said second difference frequency wave, an adjustable ratio frequency divider circuit coupled to said second difference frequency wave selector circuit, a phase detector circuit, additional connection coupling the outputs of said adjustable ratio frequency divider circuit and said constant frequency wave generator to said phase detector to produce a potential proportional to the phase difference between the wave of said second mixer and said constant frequency wave output, a reactance tube circuit having an input coupled to said phase detector circuit and an output coupled to said controllable frequency wave generator.

6. A wide range, frequency-stable wave generating circuit arrangement including a controllable frequency wave generator, a constant frequency wave generator, a mixer circuit, connections coupling the outputs of said controllable frequency and said constant frequency wave generators to said mixer to produce a difference frequency wave, a harmonic frequency wave generator and a harmonic frequency wave selector circuit interposed between said constant frequency wave generator and said mixer circuit, a difference frequency wave selector circuit coupled to said mixer to receive said difference frequency wave, a second mixer circuit, further connections coupling the outputs of said difference frequency wave selector circuit and said constant frequency wave generator to said second mixer to produce a second difference frequency wave, a fixed ratio frequency divider circuit, a further harmonic frequency wave generator and a further harmonic frequency wave selector circuit interposed between said constant frequency wave generator and said second mixer circuit, a second difference frequency wave selector circuit coupled to said second mixer, an adjustable ratio frequency divider circuit coupled to said second difference frequency wave selector circuit, a phase detector circuit, additional connections coupling the outputs of said adjustable ratio frequency divider circuit and said constant frequency wave generator to said phase detector to produce a potential proportional to the phase difference between the wave of said second mixer and said constant frequency wave output, a second fixed ratio frequency divider circuit interposed between said constant frequency wave generator and said phase detector circuit, and a reactance tube circuit having an input coupled to said phase detector circuit and an output coupled to said controllable frequency wave generator.

7. A wide range, frequency-stable wave generating circuit arrangement including a controllable frequency wave generator, a constant frequency wave generator, a mixer circuit, connections coupling the outputs of said controllable frequency and said constant frequency wave generators to said mixer to produce a difference frequency wave, a difference frequency wave selector circuit coupled to said mixer to receive said difference frequency wave, a second mixer circuit, further connections including a fixed ratio frequency divider circuit coupling the outputs of said difference frequency wave selector circuit and said constant frequency wave generator to said second mixer to produce a second difference frequency wave, a second difference frequency wave selector circuit coupled to said second mixer circuit to select said second difference frequency wave, first and second frequency discriminator circuits coupled to said first and second difference frequency selector circuits respectively, and a tuning control circuit coupled to said controllable frequency generator to tune the same broadly in response to the relative outputs of said frequency discriminator circuits, an adjustable ratio frequency divider circuit coupled to said second difference frequency selector circuit, a phase detector circuit, a second fixed ratio frequency divider circuit connected to said fixed ratio frequency divider circuit, additional connections coupling the outputs of said second difference frequency selector and said fixed ratio frequency divider circuits to said phase detector to produce a potential proportional to the phase difference between the output waves thereof, and a reactance tube circuit having an input coupled to said phase detector circuit and an output coupled to said controllable frequency generator to tune the same exactly to said operating frequency.

8. A wide range, frequency-stable wave generating circuit arrangement including a controllable frequency wave generator, a constant frequency wave generator, a mixer circuit, connections coupling the outputs of said controllable frequency and said constant frequency wave generators to said mixer to produce a difference frequency wave, a harmonic frequency wave generator and a harmonic frequency wave selector circuit interposed between said constant frequency wave generator and said mixer circuit, a difference frequency wave selector circuit coupled to said mixer to receive said difference frequency wave, a second mixer circuit, further connections coupling the outputs of said difference frequency wave selector circuit and said constant frequency wave generator to said second mixer to produce a second difference frequency wave, a fixed ratio frequency divider circuit, a further harmonic frequency wave generator and a further harmonic frequency wave selector circuit interposed between said constant frequency wave generator and said second mixer circuit, a second fixed ratio frequency divider circuit, a second difference frequency wave selector circuit coupled to said second mixer circuit to select said second difference frequency wave, first and second frequency discriminator circuits coupled to said first and second difference frequency selector circuits respectively, a tuning control circuit coupled to said controllable frequency generator to tune the same broadly in response to the relatively outputs of said frequency discriminator circuits, an adjustable ratio frequency divider circuit coupled to said second difference frequency selector circuit, a phase detector circuit, additional connections coupling the outputs of said second difference frequency selector and said fixed ratio frequency divider circuits to said phase detector to produce a potential proportional to the phase difference between the output waves thereof, and a reactance tube circuit having an input coupled to said phase detector circuit and an output coupled to said controllable frequency generator to tune the same exactly to said operating frequency.

9. A wide range, frequency-stable wave generating circuit arrangement including a controllable frequency wave generator, a constant frequency wave generator, a mixer circuit, connections coupling the outputs of said controllable frequency and said constant frequency wave generators to said mixer to produce a difference frequency wave, a harmonic multiplier circuit interposed between said constant frequency wave generator and said mixer circuit, a difference frequency wave selector circuit coupled to said mixer to receive said difference frequency wave, a second mixer circuit, further connections coupling the outputs of said difference frequency wave selector circuit and said constant frequency wave generator to said second mixer to produce a second difference frequency wave, a further harmonic multiplier circuit interposed in said further connections, a second difference frequency wave selector circuit coupled to said second mixer to receive said second difference frequency wave, an adjustable ratio frequency divider circuit coupled to said second difference frequency wave selector circuit, a phase detector circuit, additional connections coupling the outputs of said adjustable ratio frequency divider circuit and said constant frequency wave generator to said phase detector to produce a potential proportional to the phase difference between the wave output of said second mixer and said constant frequency wave output, an additional frequency divider circuit interposed between said constant frequency wave generator and said phase detector, a reactance tube circuit having an input coupled to said phase detector circuit and an output coupled to said controllable frequency wave generator.

OLIN L. MacSORLEY.

REFERENCES CITED

The following references are of record in the file of this patent:

UNITED STATES PATENTS

| Number | Name | Date |
|---|---|---|
| 2,152,336 | Van Loon | Mar. 28, 1939 |
| 2,175,320 | Runge | Oct. 10, 1939 |
| 2,240,428 | Travis | Apr. 29, 1941 |
| 2,248,442 | Stocker | July 8, 1941 |
| 2,405,765 | Smith | Aug. 13, 1946 |
| 2,406,125 | Ziegler | Aug. 20, 1946 |
| 2,452,601 | Ranger | Nov. 2, 1948 |